(12) United States Patent
Wu et al.

(10) Patent No.: US 9,077,244 B2
(45) Date of Patent: Jul. 7, 2015

(54) EXPANDING DC/DC CONVERTER INTO MULTIPHASE DC/DC CONVERTER

(75) Inventors: Albert M. Wu, Colorado Springs, CO (US); Xiaohua Su, Colorado Springs, CO (US)

(73) Assignee: LINEAR TECHNOLOGY CORPORATION, Milpitas, CA (US)

( * ) Notice: Subject to any disclaimer, the term of this patent is extended or adjusted under 35 U.S.C. 154(b) by 0 days.

(21) Appl. No.: 13/483,693

(22) Filed: May 30, 2012

(65) Prior Publication Data

US 2013/0320951 A1  Dec. 5, 2013

(51) Int. Cl.
*G05F 1/00* (2006.01)
*H02M 3/158* (2006.01)

(52) U.S. Cl.
CPC .... *H02M 3/1584* (2013.01); *H02M 2003/1586* (2013.01)

(58) Field of Classification Search
CPC ............. H02M 3/158; H02M 2001/0045; H02M 3/1588; H02M 3/1584; H02M 3/156; G05F 1/445
USPC ............... 323/225, 268, 271, 272; 363/65, 72
See application file for complete search history.

(56) References Cited

U.S. PATENT DOCUMENTS

| | | | |
|---|---|---|---|
| 6,462,520 B1 * | 10/2002 | Mangtani et al. | 323/271 |
| 6,574,124 B2 * | 6/2003 | Lin et al. | 363/65 |
| 7,026,798 B2 * | 4/2006 | Cheung et al. | 323/271 |
| 7,626,372 B2 * | 12/2009 | Yang | 323/285 |
| 8,278,895 B2 | 10/2012 | Gardner et al. | |
| 8,497,666 B2 | 7/2013 | Nagasawa | |
| 2009/0237133 A1 * | 9/2009 | Yang | 327/161 |

(Continued)

FOREIGN PATENT DOCUMENTS

| | | |
|---|---|---|
| CN | 102365812 A | 2/2012 |
| TW | 200941180 A | 10/2009 |

(Continued)

OTHER PUBLICATIONS

Taiwan Patent Office. Jan. 12, 2015. Official Letter for Taiwan Patent Application No. 102119184, entitled "Expanding DC/DC Converter Into Multiphase DC/DC Converter," filed May 30, 2013.

*Primary Examiner* — Gary L Laxton
*Assistant Examiner* — Alex Torres-Rivera
(74) *Attorney, Agent, or Firm* — McDermott Will & Emery LLP

(57) ABSTRACT

A DC/DC converter configurable for operating as a multiphase DC/DC. A controller produces a master drive signal for controlling a primary power switch to produce the output DC signal at a desired level. Multiple secondary power stages are coupled between the input and the output nodes for producing an output DC signal. Each of the multiple secondary power stages has at least one secondary power switch responsive to the input DC signal for producing the output DC signal. An expander system configures the DC/DC converter for operation in a multiphase DC/DC conversion mode. The expander system is responsive to the master drive signal for producing multiple slave drive signals respectively supplied to the multiple secondary power stages for controlling secondary power switches. The slave drive signals have phases shifted with respect to the master drive signal and with respect to each other.

15 Claims, 4 Drawing Sheets

(56) References Cited

U.S. PATENT DOCUMENTS

| | | |
|---|---|---|
| 2010/0225287 A1* | 9/2010 | Schultz .................... 323/272 |
| 2010/0315847 A1* | 12/2010 | Maher ...................... 363/50 |
| 2011/0187189 A1 | 8/2011 | Moussaoui et al. |
| 2012/0091977 A1* | 4/2012 | Carroll et al. ............. 323/271 |
| 2012/0169311 A1* | 7/2012 | Malmberg et al. .......... 323/272 |

FOREIGN PATENT DOCUMENTS

| | | |
|---|---|---|
| TW | 201135265 A | 10/2011 |
| TW | 201145786 A | 12/2011 |
| TW | 201145789 A | 12/2011 |
| TW | M417600 B | 12/2011 |
| WO | 2010112094 A1 | 10/2010 |

\* cited by examiner

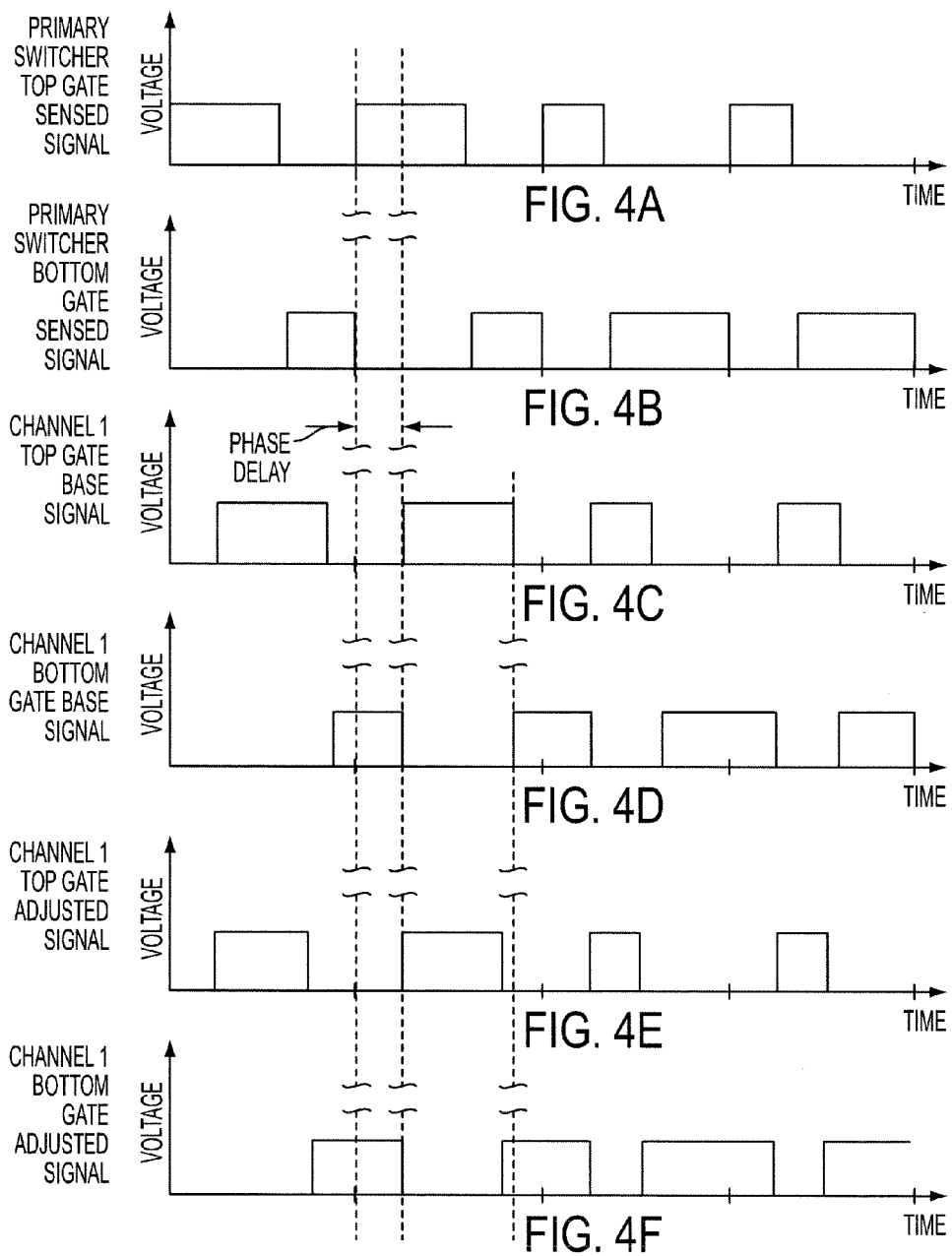

EXPANDING DC/DC CONVERTER INTO MULTIPHASE DC/DC CONVERTER

TECHNICAL FIELD

This disclosure relates to power supply systems, and more particularly, to a technique for expanding a DC/DC converter into a multiphase DC/DC converter.

BACKGROUND ART

Conventional multiphase DC/DC converters may employ two or more identical, interleaved single-phase DC/DC converters placed in parallel between the input and the load. Each of the n "phases" is turned on at equally spaced intervals over the switching period, so that the effective output-ripple frequency of the multiphase system is n×f, where f is the operating frequency of each converter, and n is the number of phases in the converter. This provides better dynamic performance and less decoupling capacitance than a single-phase system. Also, the multiphase converter system can respond to load changes as quickly as if it switched at n times as fast, without the increase in switching losses. Therefore, it is able to respond to rapidly changing loads, such as modern microprocessors.

However, conventional multiphase converter systems are not economical because they require several single-phase converters with all associated elements.

For systems with a high number of phases, it is difficult to route pins of each single-phase converter over a board. Also, individual single-phase converters in the system would influence performance of the other converters, for example, the individual converters can pick up noise from the other converters.

For buck-boost multiphase systems, the control scheme for switches are so complicated that it is difficult to make all phases to perform in a coordinated way. For example, one single-phase converter can operate in a buck-boost peak mode, while the other can operate in a buck-boost valley mode.

Therefore, there is a need for a new technique that would enable a DC/DC converter to operate as a multiphase DC/DC conversion system without the disadvantages of conventional multiphase systems.

SUMMARY OF THE DISCLOSURE

In accordance with one aspect, the present disclosure suggests a single DC/DC converter configurable into a multiphase DC/DC converter. The DC/DC converter has a primary power stage coupled between an input node and an output node, and including at least one primary power switch responsive to an input DC signal for producing an output DC signal. The converter also includes a controller for producing a master drive signal for controlling the primary power switch to produce the output DC signal at a desired level.

Multiple secondary power stages are provided between the input node and the output node for producing the output DC signal. Each of the multiple secondary power stages has at least one secondary power switch responsive to the input DC signal for producing the output DC signal.

An expander system is provided for configuring the DC/DC converter for operation in a multiphase DC/DC conversion mode. The expander system is responsive to the master drive signal for producing multiple slave drive signals respectively supplied to the multiple secondary power stages for controlling secondary power switches.

The expander system may produce the slave drive signals having phases shifted with respect to the master drive signal and with respect to each other. The phases of the slave drive signals may be determined based on a desired number of phases for the DC/DC converter.

The expander system may respond to sensed values of output current in the primary power stage and secondary power stages for varying duty cycles of the secondary power switches so as to provide equal values of the output current in all power stages of the DC/DC converter.

In an exemplary embodiment, the expander system may comprise a phase generator responsive to the master drive signal for producing at least one base slave drive signal for each secondary power stage. The base slave drive signal produced by the phase generator for a particular secondary power stage may be shifted in phase with respect to the master drive signal by an amount determined for the particular secondary power stage.

The expander system further may comprise current sense circuitry configured for comparing an average value of output current in the primary power stage with average values of output current in each secondary power stage.

Also, the expander system may comprise a duty cycle adjust circuit controlled by the current sense circuitry for producing at least one adjusted slave drive signal for each secondary power stage based on the base slave drive signal. The adjusted slave drive signal for a particular secondary power is produced to control a duty cycle of the secondary power switch in the respective secondary power stage so as to make an average value of output current in the respective secondary power stage equal to the average value of output current in the primary power stage.

Each of the primary and secondary power switches may include a MOSFET transistor. The master drive signal may be produced to control a gate of a MOSFET transistor in the primary power stage, and the multiple slave drive signals may be produced to control gates of respective MOSFET transistors in the secondary power stages.

In accordance with another aspect of the present disclosure, the following steps are carried out to configure a DC/DC converter for operation in a multiphase DC/DC conversion mode:

producing a master drive signal for controlling a primary switch in a primary power stage of the DC/DC converter coupled between input and output nodes of the DC/DC converter, and based on the master drive signal, producing multiple slave drive signals for respectively controlling secondary switches in multiple secondary power stages coupled between the input and output nodes of the DC/DC converter, the slave drive signals having phases shifted with respect to the master drive signal and with respect to each other.

The phases of the slave drive signals may be determined based on a desired number of phases in the DC/DC conversion mode.

The method may further comprise the steps of sensing values of output current in the primary power stage and secondary power stages, and varying duty cycles of the secondary switches based on the sensed values. The duty cycles of the secondary switches may be varied so as to provide equal values of the output current in all power stages of the DC/DC converter.

In accordance with a further aspect, the present disclosure suggests an expander system for enabling a DC/DC converter to operate as a multiphase DC/DC converter. The expander system comprises a phase generator supplied with a master drive signal produced by a controller of the DC/DC converter, the master drive signal being produced for controlling a primary power switch in a primary power stage coupled between input and output nodes of the DC/DC controller.

The phase generator may be configured for producing at least one base slave drive signal for controlling a secondary power switch in each of multiple secondary power stages coupled between the input and output nodes of the DC/DC converter, the base slave drive signal produced for a particular secondary power stage may be shifted in phase with respect to the master drive signal by an amount determined for the particular secondary power stage.

The expander system may further comprise current sense circuitry configured for comparing an average value of output current in the primary power stage with average values of output current in each secondary power stage, and a duty cycle adjust circuit controlled by the current sense circuitry for producing at least one adjusted slave drive signal for each secondary power stage based on the base slave drive signal. The adjusted slave drive signal for a particular secondary power switch may be produced to control a duty cycle of the secondary power switch in the respective secondary power stage so as to make an average value of output current in the respective secondary power stage equal to the average value of output current in the primary power stage.

For example, the duty cycle adjust circuit may be configured for shifting a trail of a pulse in the base slave drive signal to produce the adjusted slave drive signal.

Each of the primary and secondary power switches may include a MOSFET transistor. The master drive signal may be produced to control the gate of a MOSFET transistor in the primary power stage, and the multiple slave drive signals may be produced to control gates of respective MOSFET transistors in the secondary power stages.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein:

FIGS. 4A-4F are timing diagrams showing exemplary waveforms of various signals in the DC/DC converter of the present disclosure.

DETAILED DISCLOSURE OF THE EMBODIMENTS

The present disclosure will be made using exemplary embodiments based on a DC/DC synchronous buck converter arrangement. It will become apparent, however, that the concept of the disclosure is applicable to any DC/DC converters including buck, boost and buck-boost DC/DC converters.

Figure 1:
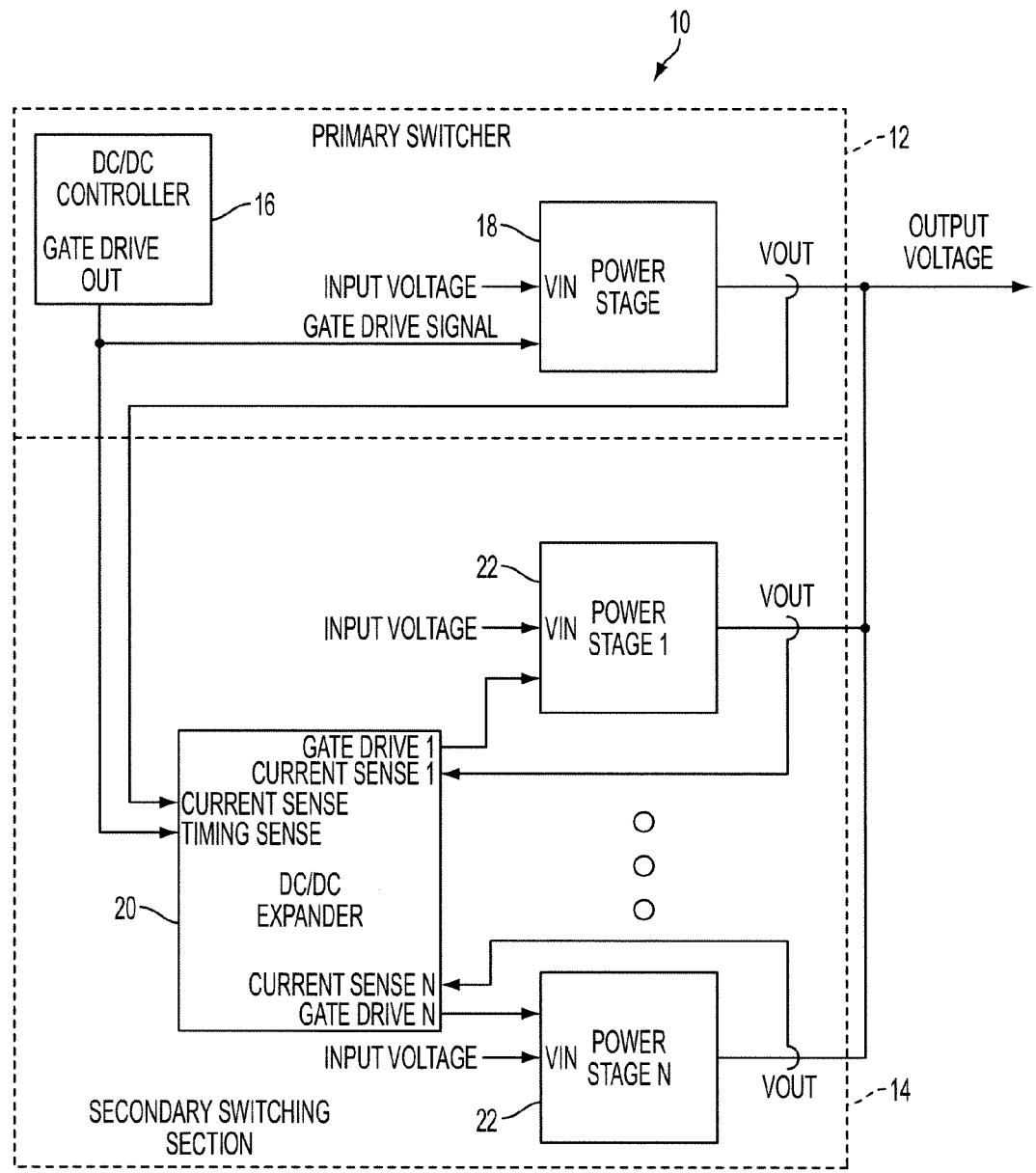
FIG. 1 shows an exemplary embodiment of a DC/DC converter of the present disclosure.

FIG. 1 shows an exemplary embodiment of a DC/DC converter 10 of the present disclosure. This converter includes a primary switcher 12 having an arrangement of a single-phase DC/DC converter. The DC/DC converter 10 further includes a secondary switching section 14 provided to configure the DC/DC converter 10 for operation as a multiphase DC/DC converter. For example, the primary switcher 12 and the secondary switching section 14 may be provided based on the same semiconductor chip, i.e. elements of the primary switcher 12 and the secondary switching section 14 may be incorporated into or attached to the same semiconductor chip.

The primary switcher 12 may include a DC/DC controller 16 and a primary power stage 18 having at least one primary power switch, such as a MOSFET, controlled by a gate drive signal from the DC/DC controller 16 to produce output DC voltage Vout having a desired value with respect to input DC voltage Vin supplied to the power stage 18. An exemplary arrangement of the power switch 18 will be discussed in more detail later.

The secondary switching section 14 may include a DC/DC expander 20 and one or more secondary power stages 22. Although FIG. 1 shows multiple secondary power stages 1 to N, one skilled in the art would realize that the concept of the disclosure is also applicable to a single secondary power stage. Each of the secondary power stages 1 to N has at least one secondary power switch, such as a MOSFET, controlled by the respective gate drive signal 1 to N produced by the DC/DC expander 20 to form the output DC voltage Vout in response to the input DC voltage Vin. Each of the secondary power stages 22 may have an arrangement similar to the arrangement of the primary power stage 18.

As discussed in more detail below, the DC/DC expander 20 receive a current sense signal from the primary power stage 18 and current sense signals 1 to N for the respective secondary power stages 1 to N. The current sense signals provide indication of current values at outputs of the respective power stages. Further, the DC/DC expander 20 receive a timing sense signal from the DC/DC controller 16. The timing sense signal may be provided based on the gate drive signal produced by the DC/DC controller 16.

Based on the timing sense signal and the current sense signals, the DC/DC expander 20 produces one or more gate drive signals 1 to N provided to the respective secondary power stages 1 to N to control the respective secondary power switches. As discussed below, the gate drive signals 1 to N are formed so as to enable the DC/DC converter 10 to operate as a multiphase DC/DC converter having (N+1) phases.

Figure 2:
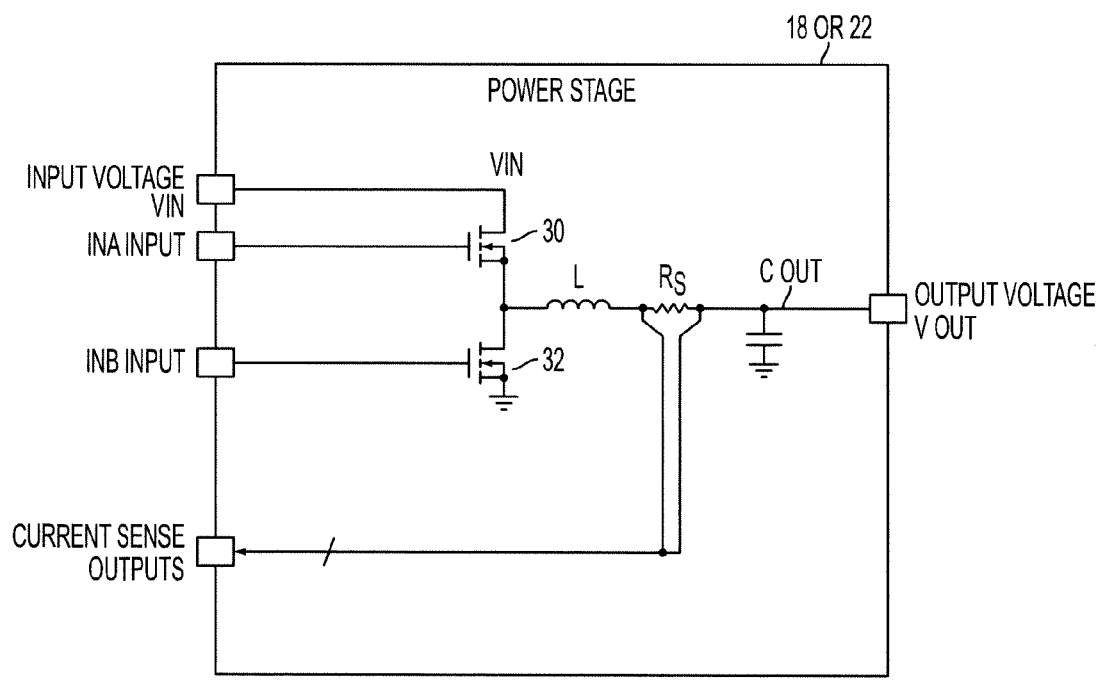
FIG. 2 illustrates a simplified exemplary embodiment of the primary power stage 18 or the secondary power stage 22 shown in FIG. 1.

For example, as illustrated in FIG. 2, each of the primary power stage 18 and secondary power stages 22 may have a synchronous buck arrangement provided to produce the output voltage Vout lower than the input voltage Vin. In a simplified exemplary embodiment in FIG. 2, each of the primary and secondary power stages has an input voltage node Vin supplied with the input DC voltage Vin, and an output voltage node Vout for producing the output DC voltage Vout. Each power stage includes a top MOSFET 30 and a bottom MOSFET 32 coupled between the input voltage node Vin and a ground terminal, an inductive element L coupled to outputs of the MOSFETs 30 and 32, a sense resistor Rs arranged for determining a value of the current at the output of the power stage, and an output capacitor element Cout coupled to the output voltage terminal Vout. The MOSFETs 30 and 32 may be N-type MOSFETs. Alternatively, P-type MOSFETS may be used as MOSFETS 30 and 32. Also, one of the MOSFETS 30 and 32 may be a P-type MOSFET, and the other MOSFET may be an N-type MOSFET.

Gates of the MOSFETs 30 and 32 are controlled by gate drive signals provided via input control nodes INA and INB, respectively. The input control nodes INA and INB may be supplied with a pair of gate drive signals being 180 degrees out of phase with respect to each other. In the primary power stage 18, the pair of gate drive signals is produced by the DC/DC controller 16. In each of the secondary power stages 22, the respective pair of gate drive signals is produced by the DC/DC expander 20.

FIG. 2 illustrates an example in which the current is sensed across the sense resistor Rs using differential current sensing at the output of the inductive element L. Via a pair of current sense outputs of the power stage, current sense signals from each of the primary and secondary power stages 18 and 22 are provided to respective current sense inputs of the DC/DC expander 20. As one skilled in the art would realize, the concept of the present disclosure can be implemented using any technique for current sensing.

Figure 3:
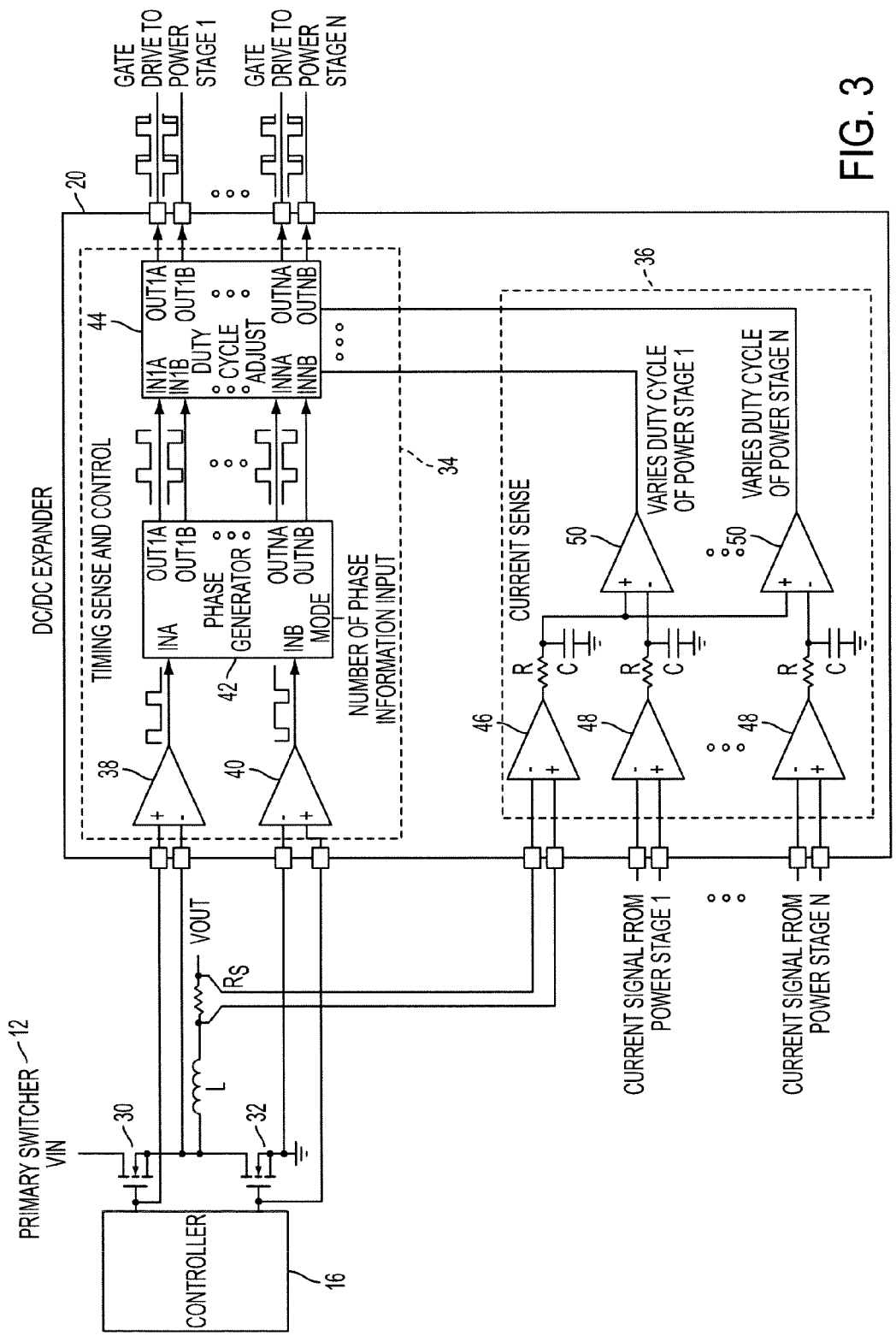
FIG. 3 shows an exemplary embodiment of the DC/DC expander shown in FIG. 1.

FIG. 3 shows a simplified exemplary embodiment of the DC/DC expander 20 that includes timing sense and control circuit circuitry 34 and current sense circuitry 36. The timing sense and control circuitry 34 includes comparators 38 and 40 that have non-inverting inputs supplied with the gate drive signals formed by the DC/DC controller 16. The comparator 38 receives the gate drive signal formed for driving the gate of the top MOSFET 30 in the primary power stage 18, whereas the comparator 40 receives the gate drive signal formed for driving the gate of the bottom MOSFET 32 in the primary power stage 18. The inverting input of the comparator 38 may be coupled to a node between the MOSFETs 30 and 32 in the primary power stage 18, and the inverting input of the comparator 40 may be coupled to a ground node in the primary power stage 18.

The outputs of the comparators 38 and 40 form a pair of master drive signals used by the expander 20 to produce multiple pairs of slave drive signals for driving pairs of MOSFETs in the respective secondary power stages 22. The signal at the output of the comparator 38 is illustrated at a timing diagram in FIG. 4A. This signal represents a signal sensed at the gate of the top MOSFET 30 in the primary power stage 18. As illustrated at a timing diagram in FIG. 4B, the signal at the output of the comparator 40 representing a signal sensed at the gate of the bottom MOSFET 32 in the primary power stage 18 may be 180 degrees out of phase with respect to the signal at the output of the comparator 38.

The master drive signals formed at the outputs of the comparators 38 and 40 are respectively supplied to inputs INA and INB of a phase generator 42. A mode input of the phase generator 42 may be used for programming the expander 20 so as to enable the expander 20 to provide operation of the DC/DC converter 10 in a multiphase mode with a desired number of phases. In particular, the mode input of the phase generator 42 may be supplied with a signal indicating a desired number of phases for operation of the DC/DC converter 10.

Based on the signal at the mode input, the phase generator 42 shifts phases of the master drive signals to provide proper phase delays of the slave drive signals for operating the DC/DC converter 10 in a multiphase mode with a desired number of phases. In particular, the phase generator 42 may include multiple phase shifting channels 1 to N having a common pair of inputs INA and INB and multiple pairs of outputs OUT1A, OUT1B to OUTNA, OUTNB corresponding to the respective secondary power stages 1 to N. In each channel 1 to N, the phase generator 42 shifts phases of the master drive signals at the inputs INA, INB to produce a pair of base slave drive signals at the respective pair of the outputs OUT1A, OUT1B to OUTNA, OUTNB having phases delayed by proper amounts with respect to the phases of the master drive signals.

FIG. 4C illustrates a base slave drive signal produced at the output OUT1A of the phase generator 42 by shifting the phase of the master drive signal at the input INA. FIG. 4D illustrates a base slave drive signal produced at the output OUT1B of the phase generator 42 by shifting the phase of master drive signal at the input INB. The phase delay between the base slave drive signal and the respective master drive signal is determined by a desired number of phases.

For example, to configure the DC/DC converter 10 into a four-phase converter, the phase generator 42 would add three additional phases to the phase corresponding to the primary switcher 12. In this case, the phase of each of the base slave drive signals at the outputs OUT1A and OUT1B of the phase shifting channel 1 may be delayed by 90 degrees with respect to the phase of the respective master drive signal. The phase of each of the base slave drive signals at the outputs OUTNA and OUT2B of the phase shifting channel 2 may be delayed by 180 degrees with respect to the phase of the respective master drive signal. Finally, the phase of each of the base slave drive signals at the outputs OUT3A and OUT3B of the phase shifting channel 3 may be delayed by 270 degrees with respect to the phase of the respective master drive signal. This would result in the highest level of ripple cancellation at both input and output of the DC/DC converter 10.

The base slave drive signals from outputs OUT1A, OUT1B to OUTNA, OUTNB are respectively supplied to inputs IN1A, IN1B to INNA, INNB of a duty cycle adjust circuit 44 that modifies the duty cycles of the secondary power switches in the secondary power stages 22 so as to provide equal values of the output current in all power stages of the DC/DC converter including the primary power stage 18 and all secondary power stages 20. The duty cycle of a switch determines proportion of time that the switch is ON relative to the total period of a switching cycle including time periods when the switch is ON and OFF.

The duty cycle adjust circuit 44 has multiple control inputs 1 to N corresponding to the respective secondary power stages 1 to N. The control inputs of the duty cycle adjust circuit 44 are supplied with respective control signals produced by the current sense circuit 36 that receive current sense signals from the primary power stage 18 and all secondary power stages 22. The current sense circuit 36 includes a primary operational amplifier 46 and multiple secondary operational amplifiers 48 respectively corresponding to the multiple secondary power stages 22. The primary operational amplifier 46 senses the current across the sense resistor Rs in the primary power stage 18. Each of the secondary operational amplifiers 48 senses the current across the sense resistor Rs in the respective secondary power stage 22.

An averaging RC circuit composed of a resistor R coupled to a capacitor C is provided at the output of each operational amplifier 46 and 48 so as to determine an average value of the current sensed from the respective primary or secondary power stage. Via the averaging RC circuit, the output of the operational amplifier 46 is coupled to non-inverting inputs of multiple operational amplifiers 50 respectively corresponding to the multiple secondary power stages 22. An inverting input of each operational amplifier 50 is coupled via the averaging RC circuit to the output of the corresponding operational amplifier 48. Each operational amplifier 50 compares an average value of the current sensed from the primary power stage 18 with an average value of the current sensed from the corresponding secondary power stage 22. When the average current value sensed from any of the secondary power stages 22 differs from the average current value sensed from the primary power stage 18, the corresponding operational amplifier 50 produces an output signal indicating a difference between the average current values so as to vary the duty cycle of the power switch in the respective secondary power stage 22 until the average current value in the respective secondary power stage 22 becomes equal to the average current value in the primary power stage 18.

The output signals of the operational amplifiers 50 are fed into the respective control inputs 1 to N of the duty cycle adjust circuit 44 that may include multiple duty cycle adjust channels 1 to N corresponding to the multiple secondary powers stages 1 to N. Each duty cycle adjust channel 1 to N is controlled by the respective control input 1 to N so as to adjust the duty cycle of each of the MOSFETs 30 and 32 in the respective secondary power stage 1 to N, in order to make the average value of the output current in the respective secondary power stage 1 to N equal to the average value of the output current in the primary power stage 18.

If the average current value in a particular secondary power stage 22 is less than the average current value in the primary power stage 18, the respective duty cycle adjust channel increases the duty cycle of the top MOSFET 30 in that secondary power stage and respectively decreases the duty cycle of the bottom MOSFET 32 in that secondary power stage until the average current value in the secondary power stage 22 reaches the average current value in the primary power stage 18. Similarly, if the average current value in a particular secondary power stage 22 is higher than the average current value in the primary power stage 18, the respective duty cycle adjust channel reduces the duty cycle of the top MOSFET 30 in that secondary power stage and respectively increases the duty cycle of the bottom MOSFET 32 in that secondary power stage until the average current value in the secondary power stage 22 drops to a level of the average current value in the primary power stage 18.

To provide the duty cycle adjustment, each of the duty cycle adjust channels 1 to N may shift trailing edges of the base slave drive signals at the respective pair of inputs IN1A, IN1B to INNA, INNB of the duty cycle adjust circuit 44 so as to produce adjusted slave drive signals at the respective pair of outputs OUT1A, OUT1B to OUTNA, OUTNB of the duty cycle adjust circuit 44. The adjusted slave drive signals from the outputs OUT1A to OUTNA are respectively supplied to the gates of the top MOSFETs 30 of the secondary power stages 1 to N so as to control switching of the respective top MOSFETs 30 with the adjusted duty cycles. The adjusted slave drive signals from the outputs OUT1B to OUTNB are respectively supplied to the gates of the bottom MOSFETs 32 of the secondary power stages 1 to N so as to control switching of the respective bottom MOSFETs 32 with the adjusted duty cycles.

FIG. 4E illustrates an example of the adjusted slave drive signal formed at the output OUT1A of the duty cycle adjust channel 1 for supplying to the top MOSFET 30 of the secondary power stage 1. In this example, the trailing edge of the adjusted slave drive signal is shifted with respect to the base slave drive signal in FIG. 4C to reduce the duty cycle of the top MOSFET 30. The waveform in FIG. 4E also shows how the waveform would look like without the duty cycle adjustment.

FIG. 4F illustrates an example of the adjusted slave drive signal formed at the output OUT1B of the duty cycle adjust channel 1 for supplying to the bottom MOSFET 32 of the secondary power stage 1. In this example, the trailing edge of the adjusted slave drive signal is shifted with respect to the base slave drive signal in FIG. 4D to increase the duty cycle of the bottom MOSFET 32. The lightly shaded areas on the waveform in FIG. 4F show how the waveform would look like without the duty cycle adjustment.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein.

What is claimed is:

1. A DC/DC converter for converting an input DC signal at an input node of the converter into an output DC signal at an output node of the converter, comprising:
   a primary switcher configured as a single-phase converter, the primary switcher including a primary power stage coupled between the input node and the output node, and having at least one primary power switch responsive to the input DC signal for producing the output DC signal, and a controller for producing a switch drive signal for controlling the primary power switch to produce the output DC signal at a desired level,
   multiple secondary power stages coupled between the input node and the output node for producing the output DC signal, each of the multiple secondary power stages having at least one secondary power switch responsive to the input DC signal for producing the output DC signal, and
   an expander system coupled to the primary switcher for enabling the controller of the single-phase converter to control the secondary power stages for operation in a multiphase DC/DC conversion mode,
   the expander system being responsive to the switch drive signal of the controller for producing a master drive signal to form multiple slave drive signals for respectively controlling secondary power switches in the multiple secondary power stages, the slave drive signals having phases shifted with respect to the master drive signal and with respect to each other,
   the expander system responsive to a difference between sensed values of output current in the primary power stage and a secondary power stage for adjusting a slave drive signal for a respective secondary power switch so as to modify duty cycles of the secondary power switches based on the sensed values of output current.

2. The DC/DC converter of claim 1, wherein the phases of the slave drive signals are determined based on number of phases of the DC/DC converter.

3. The DC/DC converter of claim 1, wherein the expander system is configured to modify the duty cycles of the secondary power switches so as to provide equal values of the output current in all power stages of the DC/DC converter.

4. The DC/DC converter of claim 1, wherein the expander system comprises a phase generator responsive to the master drive signal for producing at least one base slave drive signal for each secondary power stage, the base slave drive signal produced by the phase generator for a particular secondary power stage is shifted in phase with respect to the master drive signal by an amount determined for the particular secondary power stage.

5. The DC/DC converter of claim 4, wherein the expander system further comprises current sense circuitry configured for comparing an average value of output current in the primary power stage with average values of output current in each secondary power stage.

6. The DC/DC converter of claim 5, wherein the expander system further comprises a duty cycle adjust circuit controlled by the current sense circuitry for producing at least one adjusted slave drive signal for each secondary power stage based on the base slave drive signal, an adjusted slave drive signal for a particular secondary power stage is produced to control a duty cycle of the secondary power switch in a respective secondary power stage so as to make an average value of output current in the respective secondary power stage equal to the average value of output current in the primary power stage.

7. The DC/DC converter of claim 1, wherein each of the primary and secondary power switches includes a MOSFET transistor, the switch drive signal is produced to control a gate of the MOSFET transistor in the primary power stage, and the multiple slave drive signals are produced to control gates of respective MOSFET transistors in the secondary power stages.

8. A method of configuring a single-phase DC/DC converter having a controller and a primary power stage controlled by the controller, for operation in a multiphase DC/DC conversion mode, using an expander, the method comprising the steps of:

producing by the controller, a switch drive signal for controlling a primary switch in the primary power stage coupled between input and output nodes of the DC/DC converter, producing by the expander, in response to the gate drive signal of the controller, a master drive signal, and based on the master drive signal, producing multiple slave drive signals for respectively controlling secondary switches in multiple secondary power stages coupled between the input and output nodes of the DC/DC converter, the slave drive signals having phases shifted with respect to the master drive signal and with respect to each other, and adjusting the slave drive signals based on differences between values of output current sensed in the primary power stage and in the secondary power stages so as to modify duty cycles of the secondary switches.

9. The method of claim 8, wherein the phases of the slave drive signals are determined based on a desired number of phases in the DC/DC conversion mode.

10. The method of claim 8, wherein the duty cycles of the secondary switches are modified so as to provide equal values of the output current in all power stages of the DC/DC converter.

11. An expander system for enabling a single-phase DC/DC converter having a controller and a single primary power stage coupled between input and output nodes of the DC/DC converter, to operate in as a multiphase DC/DC conversion mode, the expander system comprising:

a master drive circuit for forming a master drive signal based on a switch drive signal produced by the controller for controlling a primary power switch in the primary power stage of the single-phase DC/DC converter, a phase generator supplied with the master drive signal for producing a base slave drive signal for controlling a secondary power switch in each of multiple secondary power stages coupled between the input and output nodes of the DC/DC converter, the base slave drive signal produced for a particular secondary power stage being shifted in phase with respect to the master drive signal by an amount determined for the particular secondary power stage, and a duty cycle adjust circuit controlled by current sense signals corresponding to a differences between sensed values of output current in the primary power stage and in the particular secondary power stage, for modifying the base slave drive signal to produce at least one adjusted slave drive signal for each secondary power stage based on the base slave drive signal, the adjusted slave drive signal being produced to control a duty cycle of the secondary power switch in a respective secondary power stage.

12. The expander system of claim 11 further comprising current sense circuitry configured for comparing an average value of output current in the primary power stage with average values of output current in each secondary power stage to produce the current sense signals.

13. The expander system of claim 12, wherein the duty cycle adjust circuit is controlled by the current sense circuitry so as to make an average value of output current in the respective secondary power stage equal to the average value of output current in the primary power stage.

14. The expander system of claim 13, wherein the duty cycle adjust circuit is configured for shifting a trail of a pulse in the base slave drive signal to produce the adjusted slave drive signal.

15. The expander system of claim 11, wherein each of the primary and secondary power switches includes a MOSFET transistor, the switch drive signal is produced to control a gate of a MOSFET transistor in the primary power stage, and the multiple slave drive signals are produced to control gates of respective MOSFET transistors in the secondary power stages.

* * * * *